United States Patent
Zarouri et al.

[11] Patent Number: 5,859,749
[45] Date of Patent: Jan. 12, 1999

[54] FLEXIBLE CIRCUIT FOR MAGNETIC HEAD ASSEMBLY

[75] Inventors: Mourad Zarouri, San Diego; Thomas J. Bower, San Luis Obispo, both of Calif.

[73] Assignee: Read-Rite Corporation, Milpitas, Calif.

[21] Appl. No.: 840,260

[22] Filed: Apr. 14, 1997

Related U.S. Application Data

[63] Continuation of Ser. No. 533,518, Sep. 25, 1995, abandoned.

[51] Int. Cl.$^6$ ........................................................ G11B 5/48
[52] U.S. Cl. ................................................................ 360/104
[58] Field of Search ..................................... 360/104, 105, 360/106; 439/492, 493, 494, 495, 496, 497, 498, 499, 67

[56] References Cited

U.S. PATENT DOCUMENTS

| | | | |
|---|---|---|---|
| 4,379,316 | 4/1983 | Krane | 360/105 |
| 4,811,143 | 3/1989 | Ohashi et al. | 360/104 |
| 4,819,094 | 4/1989 | Oberg | 360/104 |
| 4,823,217 | 4/1989 | Kato et al. | 360/104 |
| 5,185,683 | 2/1993 | Oberg et al. | 360/104 |
| 5,392,179 | 2/1995 | Sendoda | 360/104 |
| 5,557,489 | 9/1996 | Nakashima et al. | 360/104 |

OTHER PUBLICATIONS

IBM Technical Disclosure Bulletin—"Actuator Assembly for a Disk FIle", Dunman et al, vol. 20, #5, Oct. 1977, pp. 1984–1985.

*Primary Examiner*—Stuart S. Levy
*Assistant Examiner*—Kevin M. Watkins
*Attorney, Agent, or Firm*—Nathan N. Kallman

[57] ABSTRACT

A head gimbal assembly for use in disk drive systems comprising a load beam, a flexure physically connected to the load beam, a slider physically connected to the flexure for movement with the flexure. The slider includes a transducer and n bonding pads to which the transducer is electrically connected. A flex circuit is provided having n conductors connected to the n bonding pads for providing electrical connection to the transducer, a portion of the flex circuit being routed between the flexure and the slider such that the portion, flexure and slider moves as a single unit, and a reduced stiffness area to minimize the effects on roll and pitch characteristics of the slider due to said flex circuit being connected to said n bonding pads on said slider and being routed between the flexure and slider.

5 Claims, 2 Drawing Sheets ill# FLEXIBLE CIRCUIT FOR MAGNETIC HEAD ASSEMBLY

This application is a continuation of application Ser. No. 08/533,518, filed Sep. 25, 1995, now abandoned.

FIELD OF THE INVENTION

This invention relates to magnetic head assemblies used in magnetic disk drive storage systems and in particular to the replacement of the transducer wiring with a flex (flexible) circuit in the head gimbal assembly (HGA) of a head assembly.

BACKGROUND OF THE INVENTION

A disk drive typically includes a number of magnetic disks mounted to a common spindle for rotation. Each magnetic disk surface has an associated head arm assembly which includes a head gimbal assembly. The head arm assemblies are generally attached to an actuator for positioning a transducer, which is joined to the head gimbal assemblies, with reference to data tracks on the magnetic disks. In an effort to make disk drives smaller, disk drive manufacturers want the space required for the head gimbal assemblies between adjacent magnetic disk surfaces to be as small as possible.

A head gimbal assembly is comprised of an air bearing slider on which a magnetic transducer is deposited. The slider is attached to a flexure which in turn is attached to a load beam. Transducer wires are connected to the transducer. The load beam exerts a force on the flexure/slider combination towards the surface of a disk. As the disk is rotated, an air bearing is created between the air bearing surface (ABS) of the slider and the surface of the disk which exerts a force on the head gimbal assembly away from the surface of the disk.

The transducer can be a inductive type transducer which requires two transducer wires or a magnetoresistive type transducer which requires four or more transducer wires. The transducer preferably is a thin film transducer which is deposited directly onto the slider. Over time the size of the slider has been reduced allowing the data track density on the magnetic disks to be increased thereby resulting in an increased storage capacity for a disk drive system having the same size magnetic disk. The slider size has decreased from a standard size, i.e., 0.160 inch long, 0.125 inch wide, and 0.0345 inch high, to a macro size (70% of standard), then to a nano size (50% of standard) and now to a pico size (25–35% of standard).

The stiffness of a wire is a function of the diameter, i.e. gauge of the wire and the length of the wire. As the wire length becomes shorter, the stiffness of the wire increases. As the diameter of the wire decreases, the resistivity of the wire increases resulting in a decrease in the signal-to-noise ratio, and the stiffness decreases for a given length of wire. Where a wire is bonded along the wire's length at several locations, the length of the wire defines the stiffness of the wire between two adjacent bonding points.

In the prior art, a transducer wire is attached to a bonding pad on the slider and to a point on the load beam. The stiffness of the transducer wire places stress on the bond between the bonding wire and the bonding pad, and adversely affects the freedom of movement of the flexure/slider combination and the overall flying characteristics of the slider. In order to reduce these adverse effects of the transducer wires on the head gimbal assembly, the prior art has increased the length of the transducer wires as much as possible to form a loop between the bonding point of the transducer wires on the load beam and the bonding pads on the slider. This loop is referred to as a service loop.

In a standard size slider, transducer wires used with inductive type transducers were commonly 44 gauge, had a wire diameter of 0.002 inch, and had a service loop length of 0.2 inch which yielded a relative stiffness of 0.5 for the two transducer wires.

In a nano size slider, the transducer wires used with inductive type transducers were commonly reduced to 48 gauge, a wire diameter of 0.0012 inch, and had a service loop length of 0.15 inch which yielded a relative stiffness of 0.36 for the two transducer wires.

However when a magnetoresistive type transducer with four transducer wires is used, the four transducer wires are made of 48 gauge, with a wire diameter of 0.0012 inch, and a service loop length of 0.15 inch. This results in the undesirable relative stiffness of 0.73 for the four transducer wires. To reduce the relative stiffness of the four transducer wires, the transducer wire size can be changed to 50 gauge, a wire diameter of 0.001 inch, and if the service loop length remains at 0.15 inch, the relative stiffness will be decreased to 0.36 for the four transducer wires. The increase in the gauge of the transducer wire will have the adverse effects of increasing the resistivity of the wire thereby decreasing the signal-to-noise ratio characteristic of the transducer wire and will decrease production yields because of the increased likelihood of damage to the thinner wires.

One wiring approach is for the four wires to be routed along the edge of load beam and bonded to the load beam at a bonding point near the slider. The wires then are directed over the top of the flexure to the transducer bonding pads. The size of the service loop is the wire length between the bonding point on the load beam and bonding pads. This routing of the four wires over the top of flexure has the adverse effect of increasing the spacing between adjacent magnetic disk surfaces thereby increasing the overall size of the disk drive.

Another wiring approach is for the four transducer wires to be routed along the edge of load beam. The transducer wires are divided into two groups wherein the first group of transducer wires is bonded to load beam at a point on one side of the load beam and the second group of transducer wires is bonded to the load beam at a point on the second side of the load beam. Each group of wires then forms a service loop along one side of the slider from the bonding point on the sides of the load beam to the bonding pads. This transducer wire routing has the advantages of decreasing the space between adjacent magnetic disk surfaces and the use of two service loops that aid in maintaining the stability and flying characteristics of the slider. This routing has the disadvantage of restricting how close the head gimbal assembly can come to the spindle because the service loops will be the first point of contact with the spindle thereby deceasing the number of usable tracks on each magnetic disk surface.

Another wiring approach is for the four wires to be routed along the edge of the load beam and bonded to the load beam at a point along the non-spindle side of the load beam near the slider. A service loop is formed by routing the transducer wires along the non-spindle side of slider from the bonding point on the load beam to bonding pads. This routing of the wires has the advantages of decreasing the space between adjacent magnetic disk surfaces and increases how close the head gimbal assembly can come to the spindle because a service loop will no longer be the first point of contact with the spindle. This routing has the disadvantage that the service loop will bias the slider on one side thereby adversely affecting the flying characteristics of the slider.

SUMMARY OF THE INVENTION

According to this invention, the transducer conductors of a head arm assembly are incorporated into a single flex circuit which is used to route the transducer conductors from the wiring connection points located on the actuator to the bonding points on the slider. The flex circuit is bonded to the load beam at a point to the rear of the slider and is routed between the flexure and the slider to the bonding pads on the forward face of the slider. A service loop is provided by a narrow portion of the flex circuit which is symmetrically located on the center axis of the load beam from the bonding point on the load beam to the point where the flex circuit first enters between the flexure and the slider. The flex circuit makes a transition from the surface of the load beam to the side of the load beam to provide the transducer conductors at the required location on the actuator.

The advantages of the invention are that it:

1. Enables disk drive manufacturers to have tighter disk spacing;

2. Enables disk drive manufacturers to pack more data tracks per disk by allowing the slider to fly closer to the spindle hub;

3. Eliminates flying height variations induced by the service loop or loops:

4. Eliminates any disturbances/noise induced in the service loop due to variation in the flying height of the slider;

5. Simplifies head assembly process;

6. Facilitates elimination of conformal coating presently placed upon bonding pads after the transducer conductors have been bonded to the bonding pad by reducing the strain upon the bond itself;

7. Eliminates need for high bond strength thereby possibly eliminating the need to strip the insulation from the transducer conductors before bonding since successful bonding can be obtained without first stripping the transducer conductors although the resulting bond will still be electrically acceptable but weaker in strength;

8. Makes the service loop portion of the flex circuit symmetrical about the head suspension centerline to eliminate roll bias;

9. Controls the head gimbal assembly gimbaling pitch and roll stiffness by the flex circuit bonding location and the size of the flex circuit that forms the service loop;

10. Allows variations in the conductor size in the flex circuit along the length of the flex circuit to reduce the overall resistance of a conductor in the flex circuit;

11. Increases the head gimbal assembly yaw stiffness thereby permitting faster settling time and higher track density;

12. Provides wide exposed ends of the conductors which facilitates conductor bonding and increases bond strength; and 13. Allows the flex circuit to be designed to meet the physical parameters of the head gimbal assembly so as to provide transducer wiring with consistent effects on the stiffness and flying characteristics of the head gimbal assembly.

BRIEF DESCRIPTION OF THE DRAWINGS

The above and other features and advantages of the present invention will become apparent from the following detailed description of the accompanying drawings, in which.

DETAILED DESCRIPTION OF THE INVENTION

Figure 1:
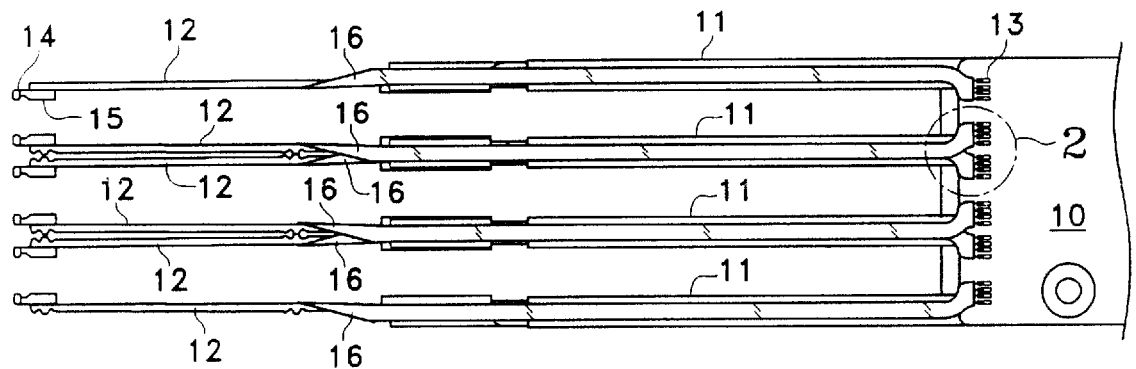
FIG. 1 is a side view of six head gimbal assemblies of the invention connected to an actuator.

Referring to FIG. 1, actuator 10 has four arms 11 to which six head gimbal assemblies 12 are attached for common movement by actuator 10. Actuator 10 has six transducer wiring terminals 13 where each wiring terminal 13 receives the four transducer conductors from a transducer 14 on a slider 15 carried by one of the six head gimbal assemblies 12. Flex circuits 16 contain the wiring terminals for connecting transducer 14 to wiring terminals 13 on actuator 10. Each flex circuit 16 is shown as being routed from the slider side of a head gimbal assembly 12 along a side of arm 11 to a wiring terminal 13 on actuator 10. The flex circuits 16 on the arm 11 of the actuator 10 having two head gimbal assemblies 12 are overlapped along the side of actuator arm 1 and then the respective ends of each of the flex circuits 16 fan out to mate with a wiring terminal 13 on actuator 10.

Figure 2:
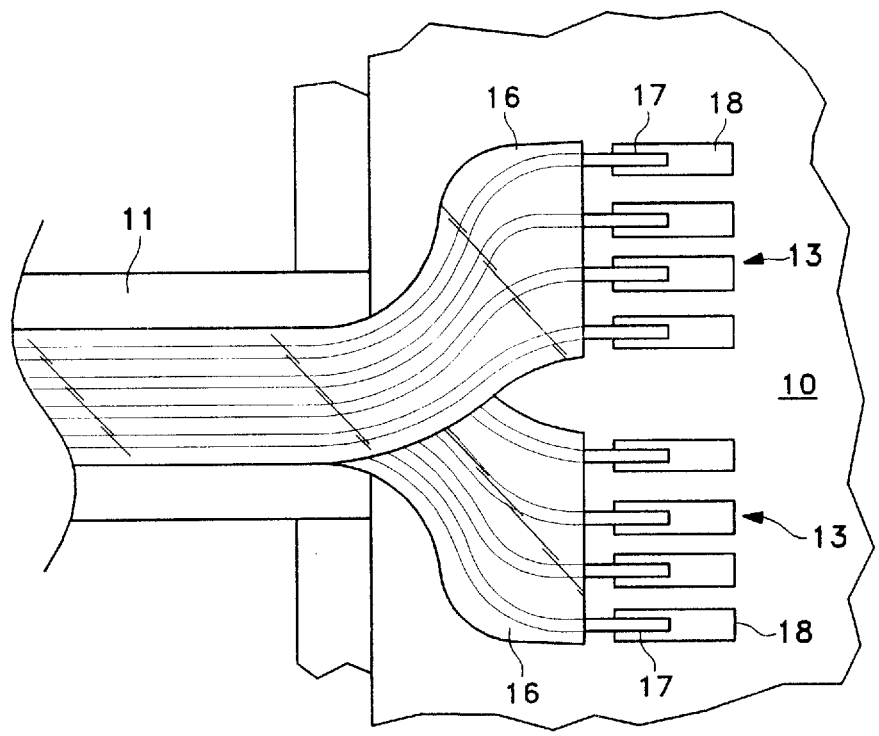
FIG. 2 is an enlarged partial plan view showing the connection of two flex circuits bonded to two transducer wiring locations on the actuator.

FIG. 2 is an exploded view of portion 2 of FIG. 1 and shows the fanning out of the end of the flex circuits 16 to allow ease in bonding each conductor 17 of the flex circuits 16 to a bonding pad 18 located at a wiring terminal 13.

Figure 3:
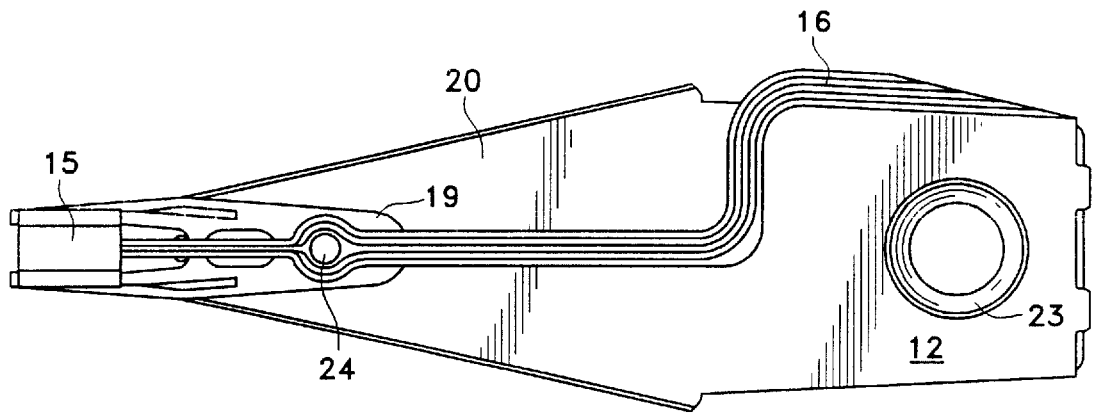
FIG. 3 is a plan view of the flex circuit routing along the surface of the load beam of a head gimbal assembly.

FIG. 3 shows the slider 15 of a head gimbal assembly 12. Head gimbal assembly 12 is composed of a load beam 20, flexure 19, slider 15 and flex circuit 16. Slider 15 includes transducer 14 (see FIG. 1) and transducer bonding pads 21 (see FIG. 5) and is connected to flexure 19. Flexure 19 is connected to load beam 20 and allows roll and pitch movement of the slider 15. Load beam 20 has a mounting ring 23 which is used to connect the head gimbal assembly 12 to arm 11 of actuator 10. Load beam 20 and flexure 19 have an alignment hole 24 which is used to align the six head gimbal assemblies 12 with each other with reference to actuator 10.

Flex circuit 16 is shown being routed from the side of load beam 20 to the center of load beam 20 and then symmetrically along the centerline of load beam 20 and flexure 19 to prevent any biasing of the load beam 20 by flex circuit 16. Flex circuit 16 is symmetrically routed around alignment hole 24 to prevent any further biasing of the load beam 20 by flex circuit 16. Flex circuit 16 narrows before passing between slider 15 and flexure 19 so as to provide a length of the flex circuit 16 that has low stiffness characteristics. The narrow length of the flex circuit 16 is not bonded to flexure 19 or the load beam 20. Flex circuit 16 is bonded to flexure 19 in the area of alignment hole 24 and to the load beam at various points between alignment hole 24 and mounting ring 23. A service loop is formed by the portion of the flex circuit 16 between the point that flex circuit 16 is bonded to flexure 19 in the area of alignment hole 24 and the first point of passage of flex circuit 16 between flexure 19 and slider 15. The service loop is therefore located to the rear of the slider 15 and does not have any adverse effects on the flying characteristics if the slider 15.

Figure 4:
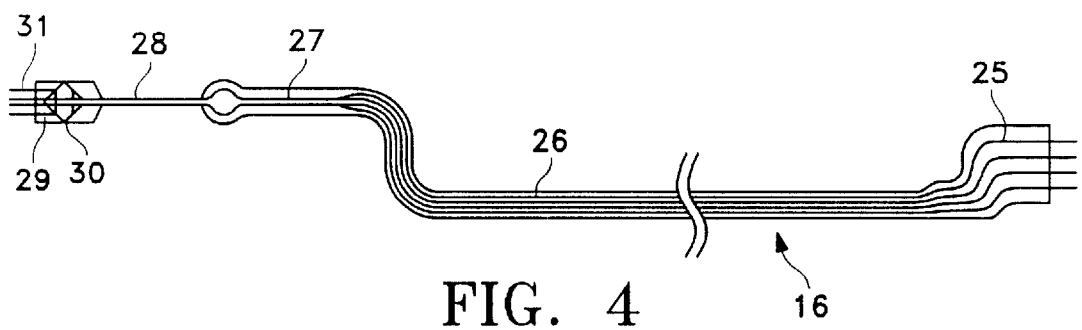
FIG. 4 is a side view of the flex circuit of the invention.

FIG. 4 illustrates the flex circuit 16 of the invention. Flex circuit 16 has a first area 25 wherein the four conductors are widened and spaced further apart to ease connecting of the four conductors to the bonding pads 18 on wiring terminals 13 on actuator 10. The configuration of the four conductor bonding pads in area 25 are designed to mate with the bonding pads 13 configuration of wiring terminals 18 on actuator 10. Area 26 of flex circuit 16 is of the length required to extend the four conductors from area 25 to the center line of the load beam 20 of the head gimbal assembly 12 with which the flex circuit 16 is to be used with. The size of the conductors may be enlarged in areas 25, 26, 27 and 29 to reduce the line resistance of each of the conductors. Area 28 of flex circuit 16 is designed to be symmetrical about the center line of the load beam 20 and/or flexure 19 to minimize any adverse roll and pitch effects the flex circuit 16 may have on the load beam 20 and flexure 16 when bonded to the load beam 20 and/or flexure 16.

Area 28 of the flex circuit 16 is reduced in width so as to reduce the stiffness of the flex circuit 16 in area 28. The stiffness is reduced to minimize the effect of the flex circuit 16 being connected to the slider 15 and to allow the slider 15 to have approximately the same roll and pitch characteristics as the slider 15 would have had if the flex circuit 16 was not attached to the slider 15.

The stiffness of the area 28 is proportional to the width of area 28 multiplied by the cube of the thickness of area 28 divided by the cube of the length of area 28. The thickness of the flex circuit 16 in area 28 has a greater effect on the stiffness than the width of the flex circuit 28. The thickness of the flex circuit 16 is bounded by physical restraints to have a minimum thickness range of 1.7 to 2.7 mils. In the manufacture of a flex circuit 16, the thickness of the flex circuit 16 remains constant through all areas of the flex circuit 16. Thus for a given flex circuit 16 the design parameters that can be adjusted are the width and length of the flex circuit 16. It has been found that with a flex thickness of 2.7 mils and the area 28 having an approximate length of 0.170 mils and a width of 16 mils, that the roll head gimbal assembly stiffness using the flex circuit 16 of four conductor will be 0.69 gr/degree. The prior art head gimbal assembly using services loops of four wires has a stiffness of 0.8 gr/degree. The use of a flex circuit 16 allows a greater degree of freedom of movement of the slider than the prior art use of individual wires within a series loop. It has further been found the bonding of the flex circuit 16 to the load beam and/or flexure advantageously increases the yaw characteristic of the head gimbal assembly thereby allowing a head gimbal assembly using the flex circuit 16 to be used at higher track densities than the same head gimbal assembly using individual wires in a service loop configuration Area 29 of flex circuit 16 is enlarged in width and provides that the four conductors be located approximate to the transducer bonding pads 21 on slider 15. An opening 30 is provided in flex circuit 16 to allow the physical joining of the slider 15 to the portion of the flexure 19 that allows movement of slider 15. Slider 15, flexure 19 and area 29 of flex circuit 16 will move as a single unit. Four conductors 31 are provided at the end of area 28 for bonding to transducer bonding pads 21 on slider 15.

Figure 5:
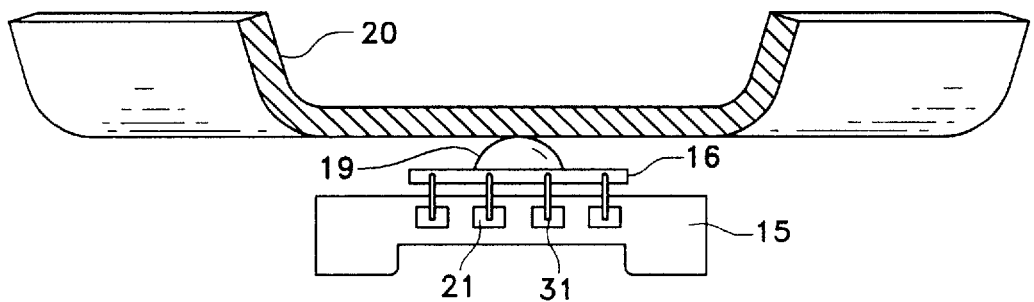
FIG. 5 is a front end view illustrating the connection of the flex circuit to the transducer bonding pads of the slider.

FIG. 5 illustrates the four conductors 31 of flex circuit 16 being bonded to the four transducer bonding pads 21 on slider 15. Flex circuit 16 is shown as being sandwiched between flexure 19 and slider 15 to form a single movable unit.

While the embodiments of the present invention are described above, it is contemplated that modifications may be made thereto for particular applications without departing from the spirit and scope of the present invention. Accordingly, it is intended that the embodiments described be considered only as illustrative of the present invention and that the scope thereof should not be limited thereto but be determined by reference to the claims hereinafter provided.

What is claimed is:

1. A head gimbal assembly for use in disk drive systems comprising:

an actuator arm having a plurality of wiring terminals;

a load beam having a longitudinal centerline;

a flexure physically connected to said load beam and having a centerline coincident with the centerline of said load beam, said flexure being formed with an alignment hole disposed on said centerline of said flexure;

an air bearing slider physically connected to said flexure, said slider having a rear end disposed towards said load beam and a front face opposite to said rear end, said slider including a transducer and a number of bonding pads on the front face of said slider to which said transducer is electrically connected; and a flex circuit that is symmetrical about said centerline of said flexure and having a number of conductors connected to said bonding pads on said slider for connecting said bonding pads to said wiring terminals of said actuator arm, a first portion of said conductors extending in a plane to said alignment hole and disposed symmetrically along said centerline of said load beam and spaced from the sides of said load beam, a portion of said flex circuit being routed to extend in a plane entirely linearly from said flexure to said rear end of said slider to form a service loop therebetween, wherein said planar and entirely linear service loop, said flexure and said slider move as a single unit; said service loop being narrowed relative to other areas of said flex circuit for providing a reduced stiffness area of said flex circuit for minimizing the effects of roll and pitch of said slider.

2. The head gimbal assembly of claim 1 wherein said reduced stiffness area of said flex circuit is located symmetrically about the center line of said load beam and is connected to said load beam.

3. The head gimbal assembly of claim 1 wherein said flex circuit has an area in which said ends of said conductors are enlarged for ease in connecting to said bonding pads.

4. A head gimbal assembly for use in disk drives comprising:

an actuator arm formed with a plurality of wiring terminals;

a load beam characterized by a longitudinal centerline;

a flexure physically connected to said load beam and having a centerline substantially in alignment with said centerline of said load beam, said flexure being formed with an alignment hole located along said centerline of said flexure;

an air bearing slider physically connected to said flexure, said slider having a rear end spaced from and facing said alignment hole and a front face opposite to said rear end;

a transducer disposed on said slider;

bonding pads formed on said front face of said slider for providing electrical connection to said transducer; and a flex circuit sandwiched between said flexure and said slider and having a first portion including a plurality of conductors extending in a plane from said wiring terminals to said alignment hole and symmetrically routed in an area around said alignment hole, and having a second portion extending in said plane from said area around said alignment hole to said rear end of said slider thereby defining a planar service loop portion that is entirely linear and symmetrically disposed about said centerline of said flexure between said alignment hole and said bonding pads on said slider, said service loop portion of said flex circuit extending symmetrically and entirely linearly from said flexure to said slider and such that said service loop portion, said flexure and said slider move as an integral unit, said service loop portion having an area of reduced width for providing reduced stiffness to minimize the effects on roll and pitch of said slider.

5. A head gimbal assembly for use in disk drives as in claim 4, wherein said flex circuit is formed with a plurality of conductors that separate and diverge for connecting to said wiring terminals of said actuator.

* * * * *